3,364,741
LINEAR AIR-SPEED SENSOR
Walter A. Hickox, Glen Cove, N.Y., assignor to Aeroflex Laboratories Incorporated, a corporation of Delaware
Filed Oct. 22, 1965, Ser. No. 500,613
4 Claims. (Cl. 73—189)

This invention relates to linear air-speed sensors and particularly to such devices of the type capable of sensing variations in air speed over a wide range, for example from substantially zero to several hundred knots.

Heretofore there have been marketed or proposed various types of air-speed sensors, among which the most common are those that measure impact pressure by means of a pitot tube and provide a measurement known in the art as "indicated air speed." Another common type measures the ratio of impact pressure to static pressure as well as the stagnation temperature of the air and computes a quantity known as "true air speed."

The indicated air-speed sensor is subject to a number of limitations. For example, it provides a true measure of air velocity only at sea level and under standard conditions and must be corrected for temperature and pressure (altitude). In addition, it is unable to measure air velocities below about 40 knots with any reasonable accuracy.

The true air-speed unit requires a measurement of pressure ratio, temperature, and complex computing circuitry and is also unable to measure speeds below 40 knots with any reasonable degree of accuracy.

Another common type of air-speed sensor is the anemometer which, while satisfactory for measuring low velocities in a given plane, also has a number of limitations and disadvantages. For example, if the device is designed with good sensitivity at low air speeds, it is too delicate to withstand the forces of speeds of several hundred knots. This limitation can be alleviated by providing a protective shroud for the rotating cups of the anemometer but the device then becomes undesirably directional. Moreover, the rotating assembly has a relatively high moment of inertia, so that its response to rapid variations of air speed is undesirably slow.

In the cases of both the anemometer type sensor and the indicated and true air-speed sensors using certain pressure transducers, the fluid whose velocity is to be measured is required to do mechanical work, for example, rotating the cups of an anemometer or deflecting the diaphragm of a pressure capsule. In such devices, friction and hysteresis effects produce errors which limit the attainable accuracy and the lower threshold of measurement. Moreover, in the case of sensors embodying force-balance pressure transducers in which the fluid is not required to do any work, the pressure is a function of the square of the velocity and thus limits the dynamic range of the velocity measurement for reasonable accuracy.

It is an object of the invention therefore, to provide a new and improved linear air-speed sensor which obviates the above-noted limitations and disadvantages of prior devices of this type.

It is another object of the invention to provide a new and improved linear air-speed sensor characterized by one or more of the following advantageous characteristics: an output signal substantially linearly representative of air speed over a wide range of air speeds from substantially zero to several hundred knots; a fast response to rapid variations of air speed; the ability, in addition to sensing the magnitude of the air speed, also to sense the direction of air flow; and the requirement of a minimum of computing mechanism or circuitry for developing a useful output.

In accordance with the invention, there is provided a linear air-speed sensor comprising a housing including a fore-to-aft air duct, a rotatable impeller mounted in the air duct and having a plurality of blades inclined to the axis of rotation, variable-speed driving means for the impeller, a pair of resistance bolometers mounted in the air duct at the exit of the impeller and inclined at equal and opposite angles to an axial plane of the air duct for varying the speed of the driving means in a sense to reduce the deviation of the exit air flow direction from the axial direction, and means responsive to the speed of rotation of the impeller for developing an effect representative of relative air speed of the sensor. While the invention is termed herein an air-speed sensor and is specifically described in an apparatus for measuring air speed, since that is its principal anticipated use, the term air-speed sensor is used herein and in the appended claims in a broad sense to include apparatus for sensing the velocity of other fluids such as gas, water, etc.

For a better understanding of the present invention, together with other and further objects thereof, reference is had to the following description, taken in connection with the accompanying drawings, while its scope will be pointed out in the appended claims.

Referring to the drawings:

FIG. 2 is a schematic representation of the electrical computing and control circuits associated with the mechanism of FIG. 1, while

Figure 1:
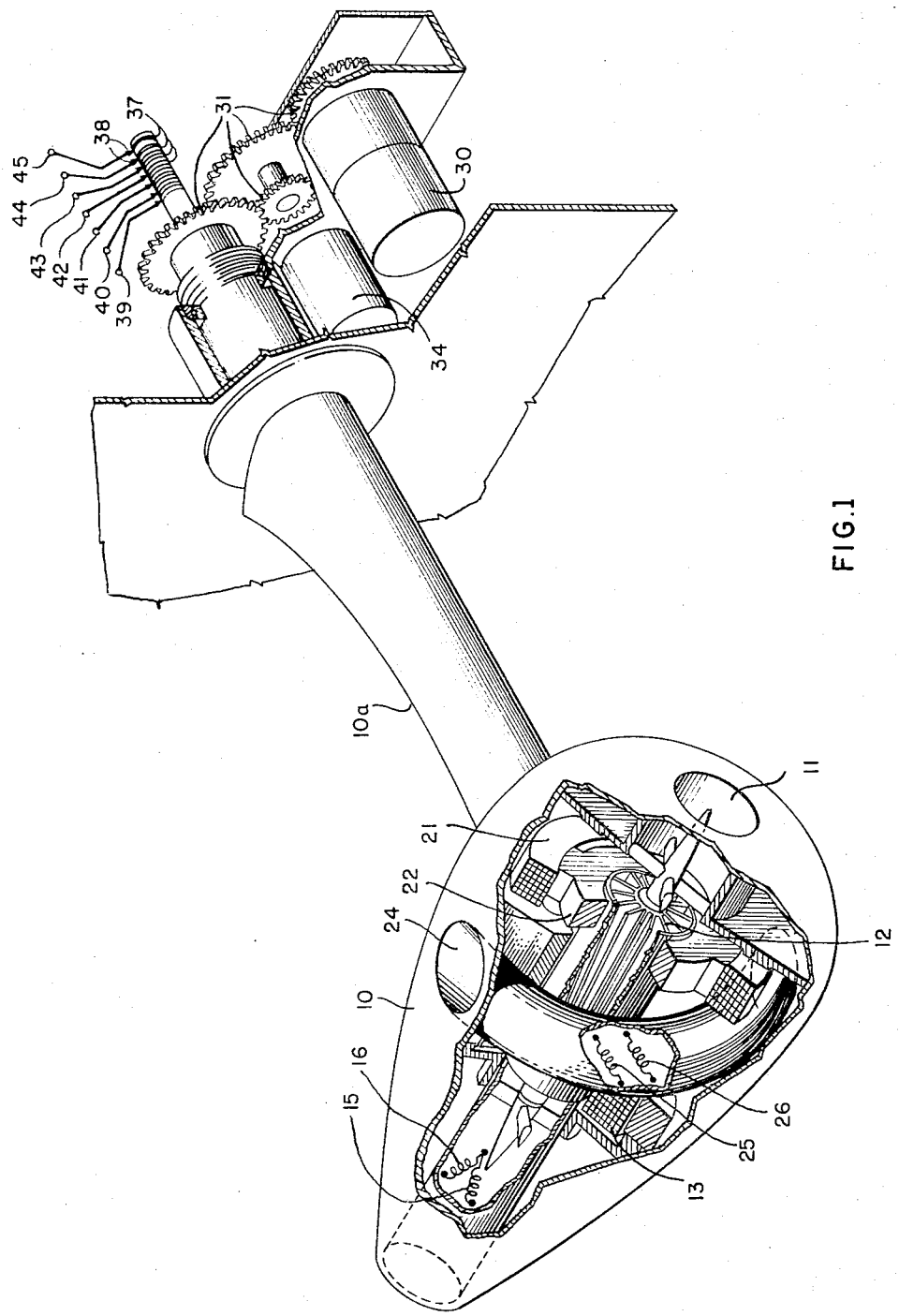
FIG. 1 is a perspective view, partly in section, of the mechanical and electromechanical portions of a linear air-speed sensor embodying the invention.

Referring now to FIG. 1 of the drawings, there is represented a linear air-speed sensor embodying the invention and comprising a housing 10 including a fore-to-aft air duct 11. Mounted in the air duct is a rotatable impeller 12 having a plurality of blades inclined to the axis of rotation. There is also provided variable-speed driving means for the impeller 12 which may be in the form of a conventional variable-speed electric motor 13, for example an induction motor, shown partly in section in FIG. 1.

The linear air-speed sensor of the invention further comprises means responsive to the direction of air flow in the duct 11 at the exit of the impeller 12 for varying the speed of the driving motor 13 in a sense to reduce the deviation of the air flow direction at that point from the axial direction. Specifically, this latter means comprises two resistance bolometers 15 and 16 mounted in the duct 11 at the exit of the impeller 12 for developing an electrical signal varying with the direction of air flow. For example, the bolometers 15 and 16 may be mounted so that each is inclined at an equal angle to an axial plane of the duct, as in the shape of the letter V, but in a plane parallel to the duct axis but displaced from the duct center line radially and oriented with the apex of the V nearest the impeller.

Figure 2:
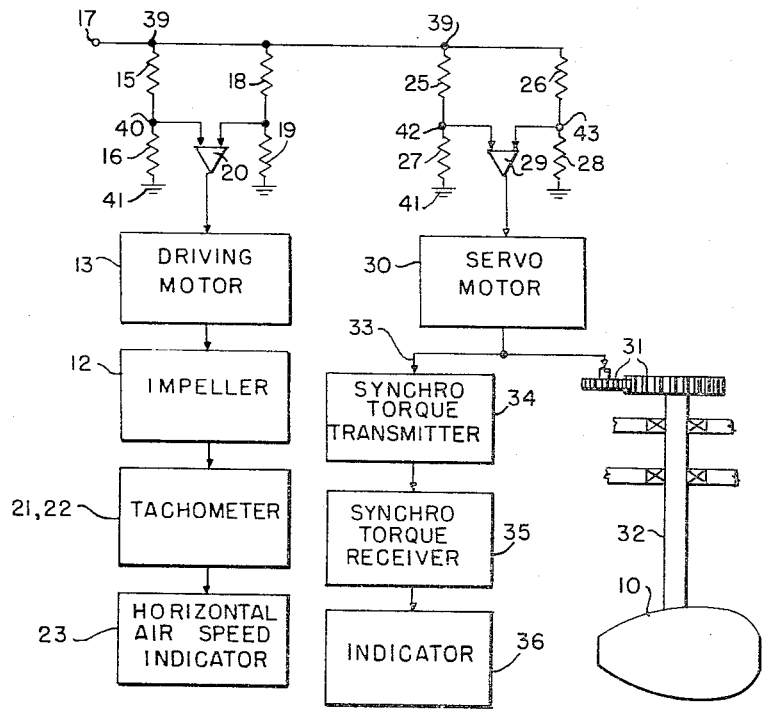

The linear air-speed sensor of the invention further comprises means differentially responsive to the resistances of the bolometers 15 and 16. This means may, as shown in FIG. 2, comprise a resistance bridge connected between a supply terminal 17 and ground and including the bolometers 15 and 16 as two legs thereof and equal-value resistors 18 and 19 as the other legs thereof. There is also provided means responsive to an unbalance of the bridge, such as an amplifier 20 connected to conjugate points of the two bridge arms and connected to vary the excitation or otherwise vary the speed of the motor 13 driving the impeller 12.

The linear air-speed sensor embodying the invention further comprises means responsive to the speed of rotation of the impeller for developing an effect representative of air speed of the sensor. This means may comprise a tachometer including a stationary armature winding 21 and a rotatable permanent magnet 22 supported on the shaft of the impeller 12 and driven therewith by the motor 13. The tachometer 21, 22 develops an electrical signal varying with the rotational speed of the impeller 12 and thus, as explained hereinafter, representative of such air speed. As indicated in FIG. 2, the output of the tachometer 21, 22 may be applied to a horizontal air-speed indicator 23 or to any desired utilization device.

The linear air-speed sensor of the invention further comprises means for sensing the direction of air flow by the sensor which comprises a transverse air duct 24 extending through the housing 10 and open at both ends at diametrically opposed points of the housing 10. There is also provided means responsive to the direction of air flow through the transverse duct 24 for adjusting the orientation of the housing 10 in a sense to diminish such flow. Specifically, there are disposed in the air duct 24 a pair of resistance bolometers 25 and 26 longitudinally spaced in the transverse duct. There is also provided means differentially responsive to the resistances of the bolometers 25 and 26. Specifically, as shown in FIG. 2, there is provided a resistance bridge including the bolometer 25 and a reference resistor 27 as one leg thereof and the bolometer 26 and a reference resistor 28 as the other leg thereof. There is provided means responsive to the unbalance of the bridge for adjusting the orientation of the housing 10 in a sense to reduce the differential response of the bolometers 25 and 26, that is, to reduce the unbalance of the bridge described. This means may be in the form of an amplifier 29 coupled through a servomotor 30 and a reduction gearing 31 to a shaft 32 on the end of which the housing 10 is disposed.

The linear air-speed sensor of the invention further comprises means responsive to the adjustment of the housing 10 for developing an effect representative of direction of air flow. Specifically, the motion of the housing 10 is transmitted by a mechanism indicated schematically at 33 to a synchro-torque transmitter 34 which, in turn, is electrically coupled to a synchro-torque receiver 35 which may be coupled to a suitable indicator or other utilization device 36. The several components and units illustrated in FIG. 2 may, if desired, be located in a position remote from the housing 10, for example in the cockpit of a plane carrying the sensor. To this end, the electrical connections to the various electrical units within the housing 10 may be brought out through an extension 10a of the housing to a series of slip rings 37 with which are associated a series of brushes 38 connected to electrical terminals 39–45, inclusive, the corresponding terminals in the circuit of FIG. 2 being similarly identified.

Figure 3:
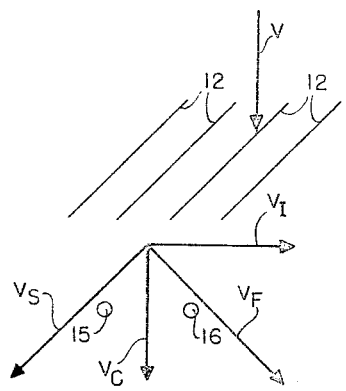
FIG. 3 is a graph to aid in the explanation of the operation of the apparatus of FIGS. 1 and 2.

For an explanation of the operation of the air-speed sensor just described, reference is made to the graph of FIG. 3. It may be assumed that the air flowing through the fore-to-aft duct 11 has a direction and velocity indicated by the vector V. This air hits the inclined blades of the impeller 12 and, if the impeller 12 were stationary, the air would exit at a velocity and direction represented by the vector $V_S$. However, if the impeller 12 is rotating in a sense such that the blades move to the right, as viewed in FIG. 3, the moving blades will impart to the air flowing therethrough a component of velocity represented by $V_I$. If the impeller 12 is moving at exactly the correct speed, the vector $V_I$ will equal the horizontal component of the vector $V_S$ and the exit velocity of the air flow will be represented by the vector $V_C$. On the other hand, if the impeller 12 is moving too fast, the air flow at the exit of impeller 12 will be shifted to that represented by the vector $V_F$.

The bolometers 15 and 16 at the exit of the impeller 12 are heated equally by an electrical current. If the impeller 12 is rotating at a speed such that its exit velocity is represented by the vector $V_C$, it is seen that bolometer 15 and bolometer 16 will be equally cooled due to the air stream. On the other hand, if the impeller 12 is rotating too slowly so that the air flow at the exit thereof moves toward the vector $V_S$, the air stream will affect the bolometer 15 more strongly than the bolometer 16 while, if the impeller 12 is moving too fast, the converse will be true.

Referring now to FIG. 2, it is seen that the bolometers 15 and 16 comprise two legs of a resistance bridge so that any difference between their resistances, due to unequal heating, will cause an unbalance of the bridge circuit. This unbalance is amplified in the amplifier 20 which is connected to control the speed of the driving motor 13 and to adjust the speed of the impeller 12 in a sense to reduce the unbalance voltage of the bridge and concurrently to reduce the deviation in the direction of the air flow from the exit of the impeller 12 from the axial direction represented by the vector $V_C$. Thus, the bolometers 15 and 16 and their associated bridge circuit respond both to the sense and magnitude of any directional deviation of the exit velocity of the air flow from the impeller 12 from the axial direction.

Therefore, as the velocity of the air entering the duct 11 and flowing through the impeller 12 varies, the speed of the impeller is automatically adjusted, as described, so that its contribution to the air speed represented by the vector $V_I$ is reduced to zero and the air passes through the blades of the impeller without impinging upon them. Thus the speed of the impeller 12 is a substantially exact and linear representation of the velocity of the air flow through the duct 11. As previously stated, the speed of the impeller 12 is measured by the tachometer generator 21, 22 in a conventional manner and applied to any utilization device such as the air-speed indicator 23.

In case the axis of the sensor is parallel to the direction of the impinging air flow, equal static pressures will be built up at the opposite ends of the transverse duct 24 so that no air will flow through this duct. Under these conditions, the two bolometers 25 and 26 assume an equilibrium condition in which they have equal values of resistance. However, should the direction of the wind change in the vertical plane (relative to the apparatus oriented as illustrated in FIG. 1), a differential pressure will appear across the transverse duct 24, causing air to flow therethrough.

Assume, for example, that the air flows downwardly through the upper opening of the duct 24 and encounters the bolometer 25. The bolometer 25 will thereby be sensibly cooled and the air sensibly heated, with the result that the trailing bolometer 26 will be cooled to a lesser extent because of the prior heating of the air. Therefore, the resistances of the bolometers 25 and 26 become unbalanced and this differential response is sensed by the bridge circuit of FIG. 2 in which they are included, the unbalance output of the bridge circuit being applied via an amplifier 29, a servomotor 30, and a gear train 31 to rotate the housing 10 in the vertical plane in the sense to reduce the differential pressure across the transverse duct 24, that is, to reduce the inclination of the axis of the sensor to the direction of the intake air. The servomotor 30 through the mechanism 33 drives a synchro-torque transmitter which, in turn, is coupled to a synchro-torque receiver and actuates the latter by an amount proportional to the movement of the housing 10. The receiver 35 is coupled to any desired utilization device such as an indicator 36 for indicating the momentary inclination between the axis of the sensor and the direction of the air flow in the vertical plane.

While the linear air-speed sensor embodying the invention has been described as applied to the measurement of the air speed in the vertical plane, it will be understood that a similar sensor may be mounted with its orientation at right angles to that shown for measuring the magnitude and direction of the air speed in the horizontal plane.

The linear air-speed sensor of the invention has a number of advantages not realized in prior air-speed sensors, among which may be mentioned the following:

(1) When used as an air-speed sensor on an aircraft, it is unaffected by variations in temperature or pressure, by the use of heating coils for de-icing, and by rain or snow.

(2) When used as an air-speed sensor on an aircraft, it measures directly true air speed, not indicated air speed, at all altitudes, requiring no computation or correction for variations in ambient conditions.

(3) The sensor is a null-seeking device which requires the air stream to do no mechanical work, thereby minimizing errors due to hysteresis and friction.

(4) The relationship between true air speed and the impeller r.p.m. is linear rather than square-law, thus substantially increasing the dynamic range of measurement with reasonable accuracy.

(5) In addition to the use of the sensor of the invention for measuring true air speed of aircraft, it is also useful as a stationary combined air-speed and wind direction sensor in lieu of the conventional anemometer, but it has a much wider and more accurate response.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A linear air-speed sensor comprising:
   a housing including a fore-to-aft air duct;
   a rotatable impeller mounted in said duct and having a plurality of blades inclined to the axis of rotation;
   variable-speed driving means for said impeller;
   a pair of resistance bolometers mounted in said duct at the exit of said impeller and inclined at equal and opposite angles to an axial plane of said duct for developing an electrical signal varying with the direction of air flow;
   means differentially responsive to the resistances of said bolometers for varying the speed of said driving means in a sense to reduce the deviation of said air flow direction from the axial direction;
   and means responsive to the speed of rotation of said impeller for developing an effect representative of relative air speed of the sensor.

2. A linear air-speed sensor comprising:
   a housing including a fore-to-aft air duct;
   a rotatable impeller mounted in said duct and having a plurality of blades inclined to the axis of rotation;
   variable-speed driving means for said impeller;
   a pair of resistance bolometers mounted in said duct at the exit of said impeller and inclined at equal and opposite angles to an axial plane of said duct for developing an electrical signal varying with the direction of air flow;
   a resistance bridge including said bolometers;
   means responsive to an unbalance of said bridge for varying the speed of said driving means in a sense to reduce the deviation of said air flow direction from the axial direction;
   and means responsive to the speed of rotation of said impeller for developing an effect representative of relative air speed of the sensor.

3. A linear air-speed sensor comprising:
   a housing including a fore-to-aft first air duct and a transverse second air duct open at both ends;
   a rotatable impeller mounted in said first duct and having a plurality of blades inclined to the axis of rotation;
   variable-speed driving means for said impeller;
   a pair of resistance bolometers mounted in said duct at the exit of said impeller and inclined at equal and opposite angles to an axial plane of said duct for developing an electrical signal varying with the direction of air flow;
   means differentially responsive to the resistances of said bolometers for varying the speed of said driving means in a sense to reduce the deviation of said air flow direction from the axial direction;
   means responsive to the speed of rotation of said impeller for developing an effect representative of relative air speed of the sensor;
   means responsive to the direction of air flow through said transverse duct for adjusting the orientation of said housing in a sense to diminish such flow;
   and means responsive to such adjustment for developing an effect representative of the direction of air flow.

4. A linear air-speed sensor comprising:
   a housing including a fore-to-aft first air duct and a transverse second air duct open at both ends;
   a rotatable impeller mounted in said first duct and having a plurality of blades inclined to the axis of rotation;
   variable-speed driving means for said impeller;
   a pair of resistance bolometers mounted in said duct at the exit of said impeller and inclined at equal and opposite angles to an axial plane of said duct for developing an electrical signal varying with the direction of air flow;
   means differentially responsive to the resistances of said bolometers for varying the speed of said driving means in a sense to reduce the deviation of said air flow direction from the axial direction;
   means responsive to the speed of rotation of said impeller for developing an effect representative of relative air speed of the sensor;
   a pair of resistance bolometers spaced in said transverse duct;
   means differentially responsive to the resistances of said bolometers for adjusting the orientation of said housing in a sense to decrease such differential response;
   and means responsive to such adjustment for developing an effect representative of the direction of air flow.

References Cited

UNITED STATES PATENTS

| 2,736,198 | 2/1956 | Kuhn | 73—188 |
| 2,983,144 | 5/1961 | Moses | 73—188 |
| 3,256,737 | 6/1966 | Sipin | 73—231 |

RICHARD C. QUEISSER, *Primary Examiner.*

JAMES J. GILL, *Examiner.*

J. W. MYRACLE, *Assistant Examiner.*